United States Patent [19]

Mick

[11] Patent Number: 5,562,172

[45] Date of Patent: Oct. 8, 1996

[54] WHEELED VEHICLE ARRANGEMENT FOR DISTRIBUTING AGRICULTURAL MATERIALS IN FIELDS HAVING UNDULATIONS SUCH AS SOFT WALLED LEVEES AND THE LIKE

[76] Inventor: Jeffrey Mick, 9304 Hess Rd., Edwardsville, Ill. 62025

[21] Appl. No.: 177,932

[22] Filed: Jan. 6, 1994

[51] Int. Cl.$^6$ .................................................. B62D 61/10
[52] U.S. Cl. ...................... 180/24.02; 280/5.2; 280/677
[58] Field of Search .................................. 240/5.2, 5.32, 240/688, 204, 679, 677, 789; 180/24.02

[56] References Cited

U.S. PATENT DOCUMENTS

| | | | |
|---|---|---|---|
| 1,857,343 | 5/1932 | Armington et al. | 280/677 |
| 2,982,560 | 5/1961 | Santoro | 280/5.28 |
| 3,417,832 | 12/1968 | Ziccardi | 180/9.3 |
| 4,056,158 | 11/1977 | Ross | 180/24.02 X |
| 4,119,163 | 10/1978 | Ball | 180/6.5 |
| 4,397,473 | 8/1983 | Miles et al. | 280/683 |
| 4,569,409 | 2/1986 | Kluth | 180/8.2 |
| 4,702,331 | 10/1987 | Hagihara et al. | 180/9.32 |
| 4,709,773 | 12/1987 | Clement et al. | 180/9.32 |
| 4,727,949 | 3/1988 | Rea et al. | 180/9.32 |
| 4,840,394 | 6/1989 | Bickler | 280/677 |
| 4,861,065 | 8/1989 | Cote | 180/24.02 X |
| 4,993,912 | 2/1991 | King et al. | 414/729 |
| 5,163,698 | 11/1992 | Evens | 280/404 |
| 5,273,296 | 12/1993 | Lepek | 280/5.2 |

FOREIGN PATENT DOCUMENTS

| | | | |
|---|---|---|---|
| 1000698 | 1/1957 | Germany | 280/677 |
| 1952821 | 4/1971 | Germany | 280/677 |
| 2025225 | 12/1971 | Germany | 280/677 |
| 0207706 | 9/1988 | Japan | 180/24.02 |
| 0302060 | 10/1965 | Netherlands | 280/677 |

*Primary Examiner*—Christopher P. Ellis
*Attorney, Agent, or Firm*—Ronald P. Kananen

[57] ABSTRACT

Soft low pressure type trailer wheels are supported on inverted V-shaped wheel tandem-type support members. Each of the wheel support members is pivotally supported on a side of the trailer and arranged such that the front wheels are supported about twice as far ahead of the pivot axis as the rear wheels are supported behind the axis. The pivot axis is arranged in the vicinity of the pivot point of the trailer. With this arrangement the front wheels may readily ascend a slope while "cranking" the rear wheels downwardly using the mechanical advantage provided by the longer forward support portions of the wheel support members. This tends to maintain the trailer relatively level. The arches provided by the inverted V-shaped wheel support members also provide sufficient ground clearance that the tops of the soft walled levees or the like type of undulations over which the trailer is towed, are not damaged to any extent. When descending slopes the front wheels can descend faster than the rear wheels tend to rise and thus again assist in maintaining the trailer in an essentially level (horizontal) state. Variable stoppers or limits are provided on each side of the trailer and can be set to damp the amount of rotation of the wheel support arms about their respective axes and slow and/or limit the decent of the front wheels. The prime mover which tows the trailer, is also provided soft low pressure tires.

6 Claims, 4 Drawing Sheets

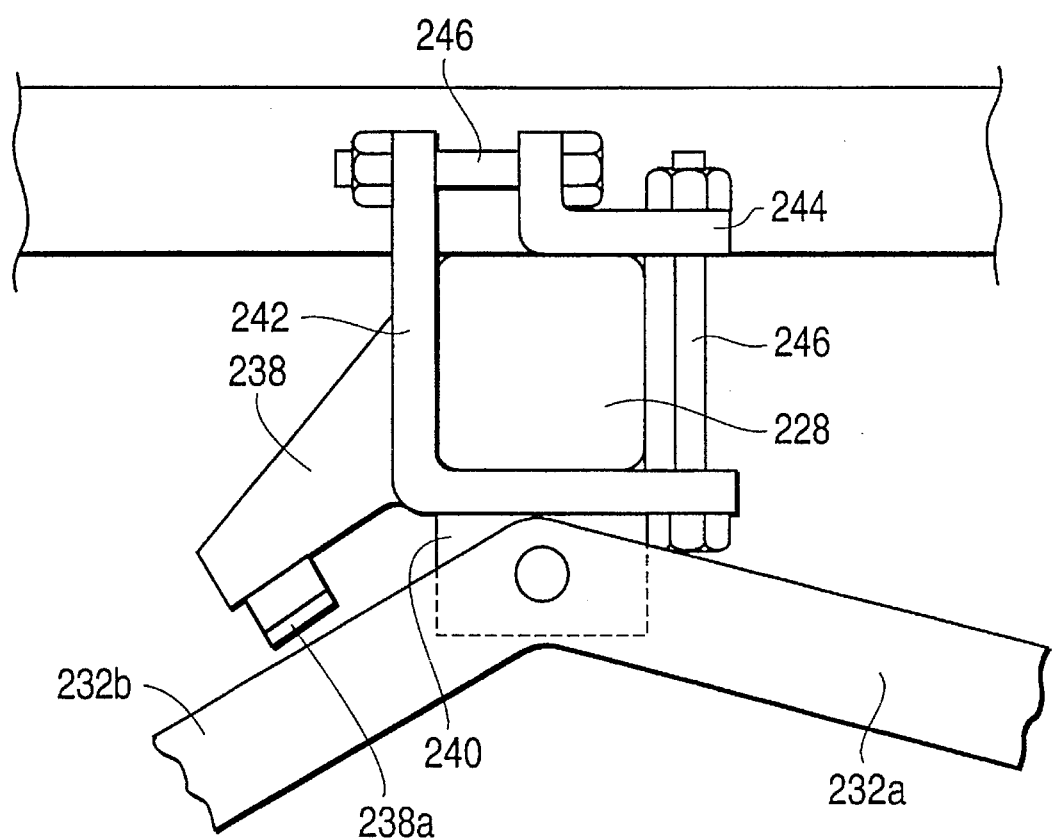

WHEELED VEHICLE ARRANGEMENT FOR DISTRIBUTING AGRICULTURAL MATERIALS IN FIELDS HAVING UNDULATIONS SUCH AS SOFT WALLED LEVEES AND THE LIKE

BACKGROUND OF THE INVENTION

1. Field of the Invention

The present invention relates generally to agricultural vehicles. More specifically, the present invention relates to an agricultural vehicle which is capable of traversing trough formations such as levees and the like.

2. Description of the Relevant Art

It is currently a common practice to spray rice fields using aircraft. In fact, virtually all chemical application on rice is carried out by aircraft. However, this practice suffers from a number of drawbacks. The technique tends to be expensive and suffers from target spray drift which tends to be a major source of environmental problems. Further, timely aerial application can be a problem because crop dusting type aircraft cannot operate in high winds. Additionally, it is difficult to spray irregularly-shaped fields.

Conventional ground application spray rigs encounter difficulties in crossing rice levees because essentially all conventional tractors, trucks, trailer sprayers, and self-propelled sprayers use high pressure tires. These tires exhibit little or no flexure and apply a high force per unit area pressure to the surface under the tire. This tends to crush and flatten freshly pulled or plowed levees and induces the need to manually repair, using a hand shovel or the like, the ruts created by the tires.

In addition to the damage to the levees, conventional spray equipment has also suffered from a relatively large amount of mechanical breakage due to the vertically-oriented jolting caused when a levee is traversed.

In an effort to overcome the above mentioned problems encountered with aircraft and conventional tractor type equipment, and to ensure that timely spraying of rice crops and the like could be assuredly carried out irrespective of the ground and wind conditions, the applicant developed an ATV (all terrain vehicle) sprayer which exhibits excellent floatation capability on extremely soft ground.

This arrangement (shown in FIG. 1) comprised an ATV prime mover and an ATV sprayer vehicle (trailer). Both the ATV prime mover and the trailer used very soft low pressure elastic tires which exhibit very high flexing and floatation capabilities. The low weight of the ATV prime mover and ATV sprayer vehicle (hereinafter ATV sprayer) produced a very low ground pressure and enabled the ATV prime mover and ATV sprayer to roll over extremely soft ground without leaving ruts. This arrangement worked very well on level land in corn, wheat and soybeans.

However, the ATV sprayer vehicle in this instance used a conventional tandem axle including a cross-beam bracing arrangement interconnecting the front and back axles and was arranged so that the front and rear axles were spaced equally on either side of the pivot or fulcrum point of the two axles. In other words, the front and rear axles were spaced in a fixed 1:1 relationship with respect to the point intermediate the two axles about which the vehicle tends to tilt.

However, several features of this design prevented the ATV sprayer from crossing levees. The first was that the 1:1 axle spacing did not allow the vehicle to readily ascend the uphill face of a levee. Moreover, once on top of the levee, the vehicle chassis tended to straddle the levee and bring about the situation wherein the cross-beams which interconnect the front and rear axles either cut into or dragged across the top of the levee. The damage which resulted from this cutting or dragging action often was so severe as to require someone to use a shovel to repair the levee.

Another acute problem that was encountered is illustrated in FIG. 1. As shown, after the prime mover 10, in this case a four wheel ATV, has crossed the levee or undulation 12, the rigid connection 14 between the ATV (prime mover) and the trailer (ATV sprayer) 16 tended to hold the trailer level; that is, prevent the trailer from assuming a posture conducive to uphill travel. Therefore, the leading wheels 20 were subjected to a force which tended to pull them "straight through" the levee 12 and result in the generation of a moment of force which was sufficient to lift the rear wheels 22 off the ground in the manner illustrated in FIG. 1, and cause the ATV sprayer 16 to teeter forward.

This collision-like encounter with the front or ascending wall 12a of the levee produced an impact which was undesirably imparted to the spraying apparatus 24 mounted on the trailer (ATV sprayer) 16 and generated sufficient resistance, as the front wheels 20 tended to sink into the relatively soft wall 12a, to keep the ATV sprayer 16 teetering and in some cases to cause the ATV prime mover 10 to lose traction.

SUMMARY OF THE INVENTION

It is an object to provide a pivotal tandem axle arrangement for a trailer which allows the trailer to traverse undulations such as levee banks with relative smoothness and in a manner which prevents the soft walls of the levees, which have been formed by plowing and the like, from being rutted by either the wheels of the trailer or the framework used to connect the wheels with the trailer chassis.

It is another object of the invention to provide a trailer which features a pivotal tandem axle beam arrangement on each side, which is simple and which allows the trailer to "step or walk over" humps and like types of undulations and thus enable spraying or like types of agricultural treatment apparatus to be towed over relatively soft levied fields such as those used for the growing of rice, without rutting either the levee banks or the soft soil of the field.

In brief, the above objects are achieved by an arrangement wherein the trailer wheels are supported on a pair of longitudinally extending, inverted, V-shaped wheel tandem-type support beams. Each of the wheel support beams is pivotally supported on a side of the trailer and asymmetrically arranged such that the front wheels are supported about twice as far ahead of the pivot axis as the rear wheels are supported behind the axis. With this arrangement, the front wheels may readily ascend a slope while "cranking" the rear wheels downwardly using the mechanical advantage provided by the longer forward support portions of the wheel support members. As the axes about which beams are pivoted are located toward the rear of the trailer chassis, this cranking tends to lift the aft end of the chassis and therefore tend to maintain the trailer relatively level. The arches provided by the asymmetric inverted V-shaped wheel support members also provide sufficient ground clearance that the tops of the soft walled levees or the like type of undulations over which the trailer is towed, are not contacted and damaged to any extent. When descending slopes, the front wheels can descend faster than the rear wheels rise and thus again, in combination with the connection between the trailer and the prime mover, tend to maintain the trailer in an essentially level or horizontal state. Variably positioned stoppers or limits are provided on each side of the trailer and can be set to damp/limit the amount of rotation of the wheel support arms about their respective axes and slow and/or limit the descent of the front wheels after the wheel support arms have undergone a predetermined amount of rotation and have reached given angular positions with respect to the trailer chassis.

The trailer is preferably provided with large surface area low pressure tires to avoid apply large force/unit area forces to crops and soil over which the trailer is drawn. For the same reason, the prime mover which is used to tow the trailer is also preferably provided with this same type of tires.

Some of the outstanding features of the invention are provided in that the "walking" beams of this "Levee Leaper" type ATV sprayer, each pivot on an approximately ⅔–⅓ (viz., 2:1) ratio with respect to the pivot points of each tandem axle arrangement so that the leading or front wheel on each of the tandem axles is about twice as far ahead of the pivot point as the trailing or rear wheel is behind the pivot point. As mentioned above, this "doubled" spacing produces a lever effect when the front wheel encounters the steep slope of the levee and reduces the weight on the front wheel, thus reducing the effort required to induce each of the leading wheels to ascend up and over the steep grade of the levee.

The pivot point of each of the tandem beams is raised or arched above the height of the axle height of the front and rear wheel. This arch prevents either of the beams connecting the front and rear wheels from dragging or cutting into the levee top when the wheels are located on each side of the levee and thus eliminates the tedious and troublesome handwork with a shovel required to effect repairs.

When the ATV sprayer reaches the crest of the levee and begins down the descending face, the leading wheel is forced downwardly by the weight acting on the rear wheels toward the furrows on the opposite side of the levee. The wheel spacing provided by the invention can be selected such that when the rear wheels are on top of the levee or just beginning their decent the front wheels are beginning to ascend the far wall of the furrow.

In order to improve stability, an adjustable stop is provided on each side of the chassis and arranged to limit the upward movement of the rear wheels. This provision limits the depth to which the forward or front wheels can be induced to pivot downwardly with respect to the trailer chassis and enables the leading wheels to glide over the furrow rather than slamming into the far wall of the furrow. That is to say, since the trailer is connected to the prime mover by a rigid connection, the front wheels can be momentarily suspended or lifted upwardly off the ground as the sprayer is towed forward. This provides a much smoother ride, prevents equipment damage, and promotes an easier pull draft due to the front wheels not having to force their own way out of the furrow. All of this results in the amount of shock and impact which tends to be transmitted back to the sprayer or like type of apparatus which is carried on the trailer, being greatly reduced.

More specifically, a first aspect of the present invention resides in a light weight trailer which is adapted to support an apparatus and which includes means for connection with a prime mover, comprising: a chassis; first and second forward low pressure tires; first and second rear low pressure tires; first and second forward wheel support members; first and second essentially inverted V-shaped wheel support members pivotally supported on opposite sides of the chassis so as to be pivotal about a common axis at the respective apexes of the first and second wheel support members, the first and second forward wheels being respectively rotatably supported at the forward ends of the first and second wheel support members and the first and second rear wheels being respectively rotatably supported at the rear ends of the first and second wheel support members, the portions of the wheel support members which extend forward of the common axis are longer in length than the portions which extend rear of the common axis and therefore support the first and second forward wheels at a distance forward of the common axis which is greater than the distance at which the first and second rear wheels are supported rear of the common axis.

A second aspect of the present invention resides in a light weight trailer which is adapted to support an apparatus and which includes means for connection with a prime mover, comprising: a chassis; first and second forward low pressure tires; first and second rear low pressure tires; first and second forward wheel support members pivotally supported on said chassis; first and second rear wheel support members pivotally supported on said chassis, said first and second rear wheel support members being so constructed and arranged with respect to said first and second forward wheel support members that said forward wheels are respectively supported further forward of the points about which said first and second wheel support members are pivotally supported than said first and second rear wheels are supported rearwardly of the points about which said first and second rear wheel support members are pivotally supported; and means for interconnecting the first forward wheel support member and the first rear wheel support member such that movement of one of the first forward wheel support member and the first rear wheel support member induces synchronous movement in the other of the first forward wheel support member and the first rear wheel support member, and for connecting the second forward wheel support member and the second rear wheel support member such that movement of one of the second forward wheel support member and the second rear wheel support member induces synchronous movement in the other of the second forward wheel support member and the second rear wheel support member.

Another aspect of the invention resides in a light weight trailer which is adapted to support an apparatus and which includes means for connection with a prime mover, comprising: a chassis; first and second forward low pressure tires; first and second rear low pressure tires; first and second forward wheel support members; and first and second rear wheel support members which are integrally formed with the first and second forward wheel support members and pivotally supported on the chassis so as to be pivotal about a common axis, the first and second rear wheel support members being so constructed and arranged with respect to the first and second forward wheel support members that the forward wheels are respectively supported further forward of the common axis than the first and second rear wheels are supported rearwardly of the common axis, the first forward wheel support member and the first rear wheel support member being connected to defined an acute angle, and the second forward wheel support member and the second rear wheel support member being connected to define the acute angle.

BRIEF DESCRIPTION OF THE DRAWINGS

The various features and advantages of the present invention will become more clearly appreciated as a description is made with reference to the appended drawings in which:

FIG. 5 is a side elevation showing a structure via which a pivoting type walking tandem axle according to the present invention can be adjustably connected to a traverse beam which forms a part of a trailer chassis.

DESCRIPTION OF THE PREFERRED EMBODIMENTS

Figure 1:
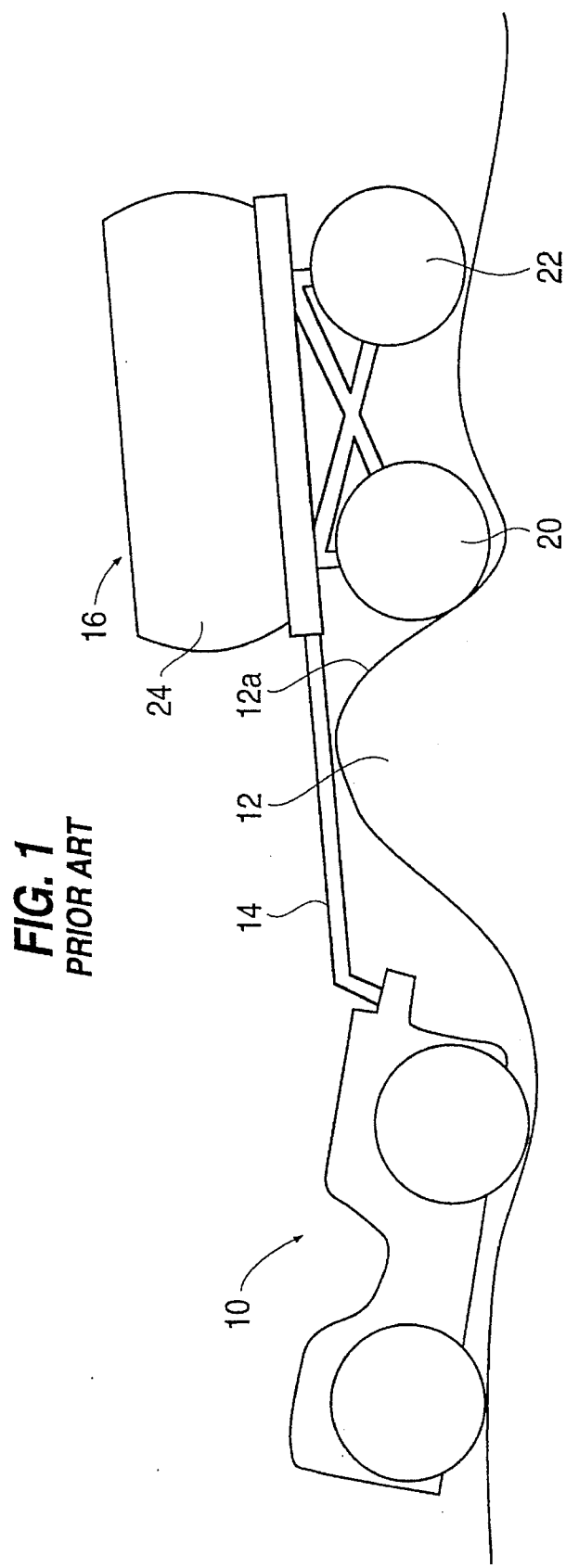
FIG. 1 is a schematic elevational view highlighting the problems which tend to be encountered with conventional type trailer arrangements and the manner in which soft walled levee banks, for example, tend to become rutted.
Figure 2:
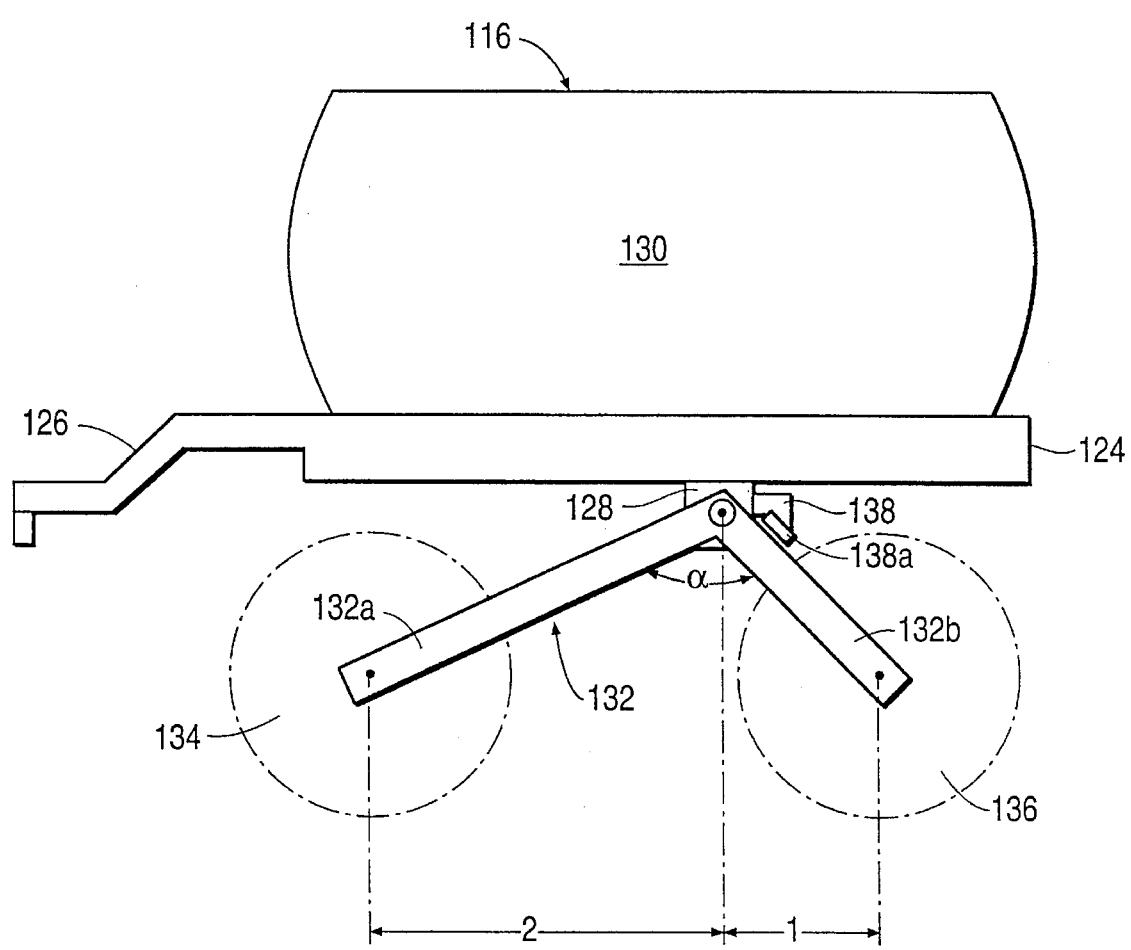
FIG. 2 is a schematic elevational view showing a first embodiment of a trailer equipped with an oscillating or pivoting type walking tandem axle arrangement which characterizes the present invention.

FIG. 2 shows a first embodiment of the present invention. In this embodiment, the ATV sprayer 116 includes a rectangular frame-work type chassis 124 and a rigid tow bar 126 which is adapted for connection to a ATV in the manner generally illustrated in FIG. 1. A robust cross beam 128 having sufficient rigidity to support the weight of the chassis 124 and any apparatus 130 which may be carried thereon, is welded to the underside of the chassis 124. Asymmetrical inverted V-shaped beam structures 132 which form an essential part of the pivotal walking-type tandem axle arrangement, are pivotally supported on each end of the cross beam 128. Each of these structures includes a forward extending leg 132a and a shorter rearwardly extending leg portion 132b. The lengths of the legs 132a, 132b and the angle α defined therebetween are selected so that the front wheels 134 are located by a distance ahead of the axis of rotation about which each arm is pivotal, which is approximately twice that by which the rear wheels 136 are located rearward of the axis. In this embodiment, each of the front and rear wheels are provided with wide profile soft low pressure all-terrain type balloon tires. To allow for the asymmetric nature of the beam structures 132, the cross beam 128 is secured at a location which is aft of the geometric center of the chassis.

Variable stoppers 138 are rigidly connected to the cross beam 128 in a manner to be enagageable with the upper side of the rearwardly extending leg portions 132b. The stoppers include elastomeric blocks which are adapted to resiliently engage the arms after a predetermined amount of upward rotation. This, as pointed out above, is such as to prevent the front wheels 134 from undergoing excessive downward movement and to even allow the connection provided between the chassis 124 and the prime mover (not shown) by the tow bar 126 to lift the front wheels off the ground or facilitate the upward ascent of the same along a upwardly extending inclined surface.

In this embodiment, the apparatus which is carried on the trailer is a spraying apparatus and only the tank in which the liquid which is to be dispersed over the field is illustrated. It will of course be appreciated that the present invention is not necessarily limited to spraying or even agricultural use, even though this arrangement clearly finds great utility in this application.

Figure 3:
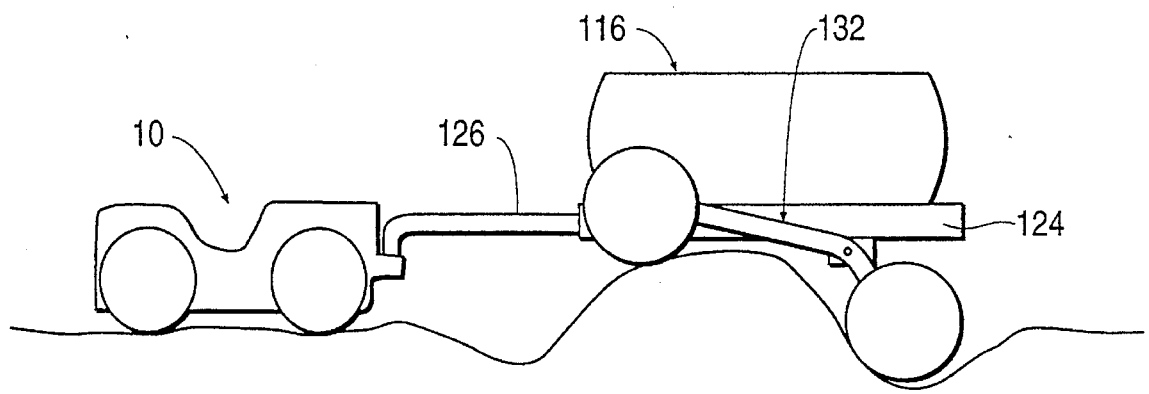
FIGS. 3 and 4 schematically depict a trailer equipped with a pivoting type walking suspension according to the present invention, ascending and descending an undulation, respectively.
Figure 4:
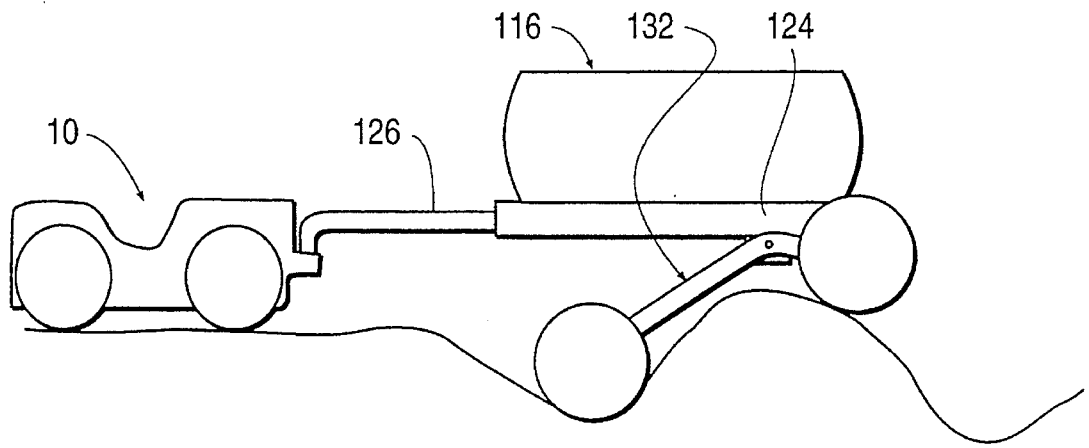

FIGS. 3 and 4 show the ATV sprayer according to the first embodiment of the present invention being towed over a levee by an ATV prime mover and depict the manner in which the pivotal walking-type tandem axle beams allow the arrangement to relatively smoothly "step up and over" the undulation or levee.

FIG. 5 shows a second embodiment of the invention. In this embodiment, rather than being secured to the ends of the cross beam 128, a support structure on which the beams are pivotally connected, are clamped to the cross-beam 228 by a cooperating pair of L-plates 242, 244 and bolts 246. This arrangement allows the width of the beams to be adjusted inwardly or outwardly as desired.

Although not specifically illustrated, it will be appreciated that various other forms of adjustment can be provided. For example, it is within the scope of the present invention to be move the axles on which the wheels are actually supported to different sites along the forward and rearwardly extending leg portions so as to modify the operational characteristics of the arrangement to take into account variables such as levee width and height for example.

The various other variations and modifications which can be made without departing from the scope of the present invention, will be apparent to those skilled in the art to which the present invention pertains given the disclosure of the above two embodiments.

What is claimed is:

1. A light weight trailer which is adapted to support an apparatus and which includes means for connection with a prime mover, comprising:

a chassis;

first and second forward wheels respectively having low pressure all terrain tires, said first and second front wheels being arranged to normally roll on terrain being traversed by said trailer;

first and second rear wheels respectively having low pressure all terrain tires, said first and second rear wheels being essentially the same diameter as said first and second forward wheels, said first and second rear wheels being arranged to constantly roll on the terrain being traversed by said trailer;

first and second unbiased essentially inverted V-shaped wheel support members pivotally supported on opposite sides of said chassis so as to be pivotal about a common axis which passes through the respective apexes of said first and second wheel support members, said axis being located aft of a geometric center of said chassis, said first and second forward wheels being respectively rotatably supported at the forward ends of said first and second wheel support members and said first and second rear wheels being respectively rotatably supported at the rear ends of said first and second wheel support members, the portions of said wheel support members which extend forward of said common axis are longer in length than the portions which extend rear of said common axis and therefore support said first and second forward wheels at a distance forward of said common axis which is greater than the distance at which said first and second rear wheels are supported rear of said common axis; and limit means for limiting the rotation of said first and second wheel support members about said common axis in a direction which permits said first and second rear wheels to move upwardly, and for preventing said first and second front wheels from undergoing more than a predetermined amount of downward movement.

2. A light weight trailer as set forth in claim 1, wherein said chassis comprises a cross beam to which said first and second wheel support members are operatively connected.

3. A light weight trailer which is adapted to support an apparatus, comprising:

a chassis;

first and second forward wheels having low pressure all terrain balloon tires;

first and second rear wheels having low pressure all terrain balloon tires, said first and second rear wheels having the same diameter as said first and second forward wheels;

first and second unbiased forward wheel support members pivotally supported on said chassis;

first and second rear unbiased wheel support members pivotally supported on said chassis, said first and second rear wheel support members being so constructed and arranged with respect to said first and second forward wheel support members that said forward wheels are respectively supported further forward of the points about which said first and second wheel support members are pivotally supported than said first and second rear wheels are supported rearwardly of the points about which said first and second rear wheel support members are pivotally supported;

means for interconnecting said first forward wheel support member and said first rear wheel support member such that movement of one of said first forward wheel support member and said first rear wheel support member induces synchronous movement in the other of said first forward wheel support member and said first rear wheel support member, and for connecting said second forward wheel support member and said second rear wheel support member such that movement of one of said second forward wheel support member and said second rear wheel support member induces synchronous movement in the other of said second forward wheel support member and said second rear wheel support member;

stopper means for abutting said first and second rear wheel support members and for limiting the pivoting of said first and second rear wheel support members in a direction which allows said first and second rear wheels to move upward; and a rigid tow bar connected to said chassis for connection to a prime mover.

4. A light weight trailer which is adapted to support an apparatus comprising:

a chassis;

first and second forward wheels which are arranged to normally roll on terrain being traversed by said trailer, said first and second forward wheels having low pressure all terrain type tires;

first and second rear wheels which are arranged to constantly roll on the terrain being traversed by said trailer, said first and second rear wheels being the same size as said first and second forward wheels, said first and second rear wheels having low pressure all terrain type tires;

first and second forward wheel support members;

first and second rear wheel support members which are integrally formed with said first and second forward wheel support members and pivotally supported on said chassis so as to be pivotal about a common axis, said first and second rear wheel support members being shorter than said first and second forward wheel support members so that said forward wheels are respectively supported further forward of said common axis than said first and second rear wheels are supported rearwardly of said common axis and so that said first and second front wheels and said first and second wheel support members cooperate to crank said first and second wheel support members and said first and second rear wheels in response to undulations in the terrain, said first forward wheel support member and said first rear wheel support member being connected to define an obtuse angle, and said second forward wheel support member and said second rear wheel support member being connected to define said acute angle; and means for limiting the rotation of said first and second unbiased rear wheel support members in a direction which allows said first and second wheels to move upward toward said chassis.

5. A trailer as set forth in claim 4, wherein said chassis includes a cross-beam and wherein said first and second rear wheel support members are operatively connected with said cross-beam in a manner to be pivotal thereabout.

6. A trailer as set forth in claim 4, wherein said chassis is adapted for connection with a relatively light weight prime mover having low pressure all terrain tires.

\* \* \* \* \*